(12) United States Patent
Scalliet

(10) Patent No.: US 6,214,236 B1
(45) Date of Patent: *Apr. 10, 2001

(54) PROCESS FOR BREAKING AN EMULSION

(76) Inventor: Robert Scalliet, 2700 Revere, Apt. 149, Houston, TX (US) 77098

(*) Notice: Subject to any disclaimer, the term of this patent is extended or adjusted under 35 U.S.C. 154(b) by 0 days.

This patent is subject to a terminal disclaimer.

(21) Appl. No.: 09/469,991

(22) Filed: Dec. 22, 1999

Related U.S. Application Data

(63) Continuation-in-part of application No. 08/886,297, filed on Jul. 1, 1997, now Pat. No. 6,056,882.

(51) Int. Cl.$^7$ .................... B01D 17/04; B01D 21/26
(52) U.S. Cl. .................. 210/708; 210/781; 210/787; 175/66; 175/206; 208/13; 516/136
(58) Field of Search .................... 210/708, 781, 210/787; 175/66, 206; 208/13, 50; 241/220, 224; 516/136

(56) References Cited

U.S. PATENT DOCUMENTS

| | | | |
|---|---|---|---|
| 3,566,204 | * 2/1971 | Callahan | 361/322 |
| 3,574,136 | 4/1971 | Werth | 510/195 |
| 3,917,564 | 11/1975 | Meyers | 208/131 |
| 4,094,770 | 6/1978 | Bose | 208/251 R |
| 4,171,264 | * 10/1979 | Benson et al. | 210/708 |
| 4,260,489 | 4/1981 | Greig et al. | 210/771 |
| 4,264,453 | 4/1981 | Mraovich | 210/774 |
| 4,456,533 | 6/1984 | Seltzer | 210/708 |
| 4,511,461 | 4/1985 | Kruyer | 209/47 |
| 4,666,585 | 5/1987 | Figgins et al. | 208/131 |
| 4,810,393 | 3/1989 | Guinard | 210/712 |
| 4,874,505 | 10/1989 | Bartilucci et al. | 208/131 |
| 4,938,876 | 7/1990 | Ohsol | 210/708 |
| 4,985,131 | 1/1991 | Lane | 208/13 |
| 4,990,237 | 2/1991 | Heuer et al. | 208/13 |
| 5,006,239 | 4/1991 | Mishra | 210/181 |
| 5,009,767 | 4/1991 | Bartilucci et al. | 208/85 |
| 5,125,966 | 6/1992 | Siefert et al. | 75/71 |
| 5,296,040 | 3/1994 | Dybus et al. | 134/25 |
| 5,439,489 | 8/1995 | Scalliet et al. | 44/281 |
| 5,443,717 | * 8/1995 | Scalliet et al. | 208/13 |
| 5,503,337 | 4/1996 | Kreuziger | 241/21 |
| 5,788,721 | 8/1998 | Scalliet et al. | 44/281 |

FOREIGN PATENT DOCUMENTS

| | | |
|---|---|---|
| 365626 | 2/1982 | (AT). |
| 10043799 | 2/1998 | (JP). |
| WO 89/09091 | 10/1989 | (WO). |
| WO 97/02088 | 1/1997 | (WO). |

OTHER PUBLICATIONS

Frank N. Kemmer, The NALCO Water Handbook 11–1—11–13 (McGraw-Hill Book Company 1979).

* cited by examiner

Primary Examiner—David A. Reifsnyder
(74) Attorney, Agent, or Firm—Baker Botts L.L.P.

(57) ABSTRACT

A process for removing even tightly emulsified oil, water and solid emulsions by the application of a shear force sufficient to break the emulsion. In one particular application, a tank bottom sludge produced in the petroleum industry is treated with the shear force of a ball or roller mill until the emulsion is broken. Simultaneous reduction in the particle size of the solid occurs. This process produces commercial grade oil, water and an aqueous slurry of solids devoid of oily compounds. The oil-free solid phase produced thereby is suited for use in a coker quench stream. The demulsification process described may be used to demulsify used oil to recover and recycle the oil constituent of the used oil. The demulsification process of the present invention may be used to demulsify waste products for the later production of a liquid fuel from the oil of the waste product.

11 Claims, 1 Drawing Sheet

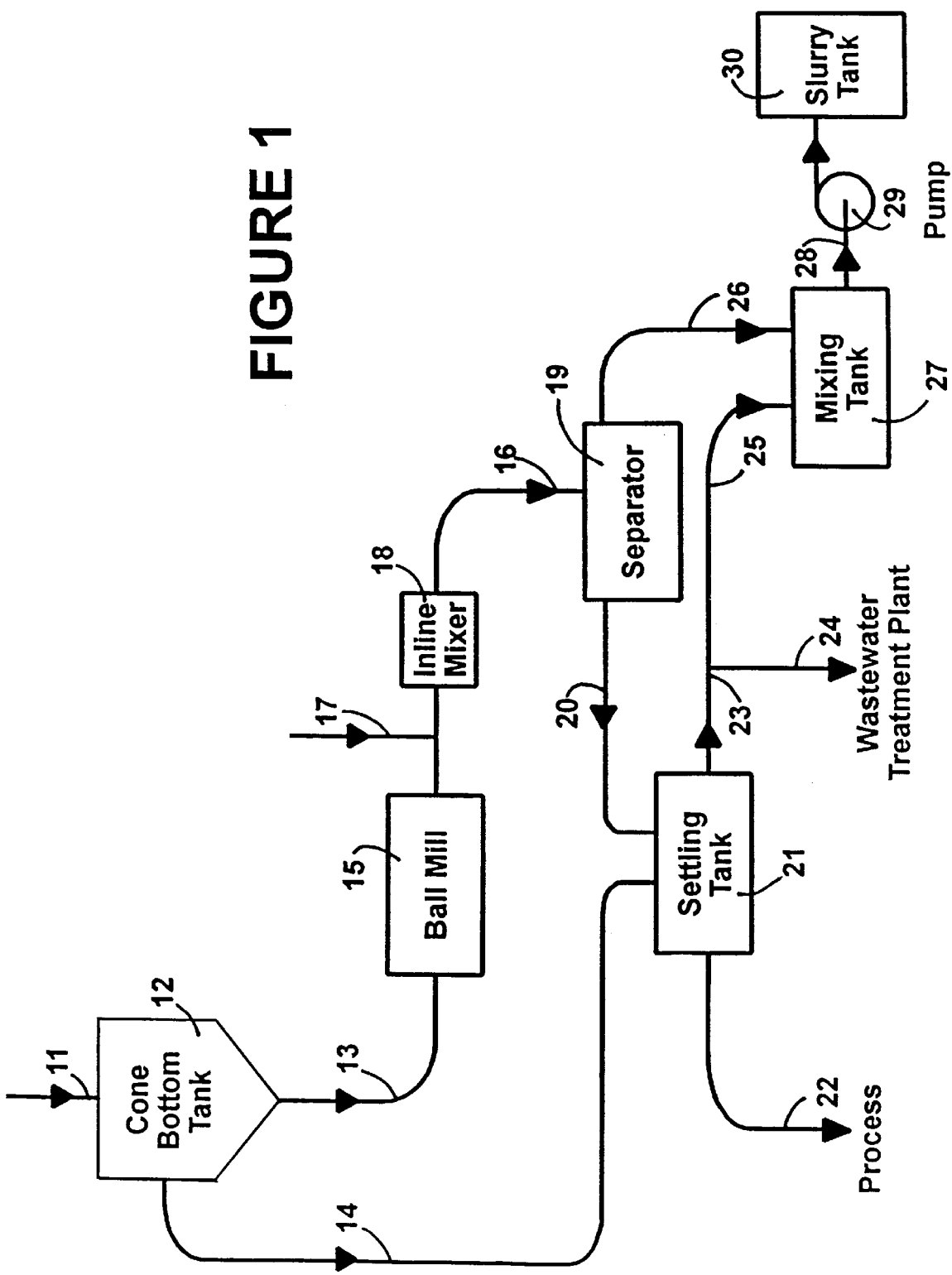

PROCESS FOR BREAKING AN EMULSION

CROSS REFERENCE TO RELATED APPLICATIONS

This application is a continuation-in-part of U.S. patent application Ser. No. 08/886,297, filed on Jul. 1, 1997, now U.S. Pat. No. 6,056,882.

TECHNICAL FIELD OF THE INVENTION

The present invention pertains to an effective, cost efficient method of separating even tightly emulsified oily waste sludges. The method can be used in treating used liquid petroleum products, and wastes generated from petroleum production and refining facilities, manufacturing plants, chemical plants, still mill sludges, municipal facilities, and other similar facilities and operations.

BACKGROUND OF THE INVENTION

Many industrial plants and municipal facilities generate waste products that are partial emulsions of water, oil and solids and are referred to as "sludges." For example, petroleum refineries and manufacturing plants generate significant quantities of oily waste products that contain a variety of solids, such as suspended carbonaceous matter and inorganic matter such as rust scales, catalysts fines and the like. Furthermore, most of this waste is classified as hazardous and, therefore, must be treated before disposal in regulated landfills to meet concentration limits for certain organic compounds, cyanides and several heavy metals.

Refinery waste sludges are among the most difficult emulsions to break. Yet the disposal criteria for solids are expensive to reach, necessitating the separation of the water, oil and solid components to minimize the amount of wastes that require disposal. Further, the hydrocarbons can be recycled in the plant's processes and the water can be treated per normal waste water treatment processes, if sufficient amounts of solids are removed. Therefore, although refinery waste sludges are very difficult to break, it is often the most economical means of treating the waste.

An emulsion may be present in oily waste products other than refinery waste sludges. Emulsions may also be present in used oil. In the oil exploration industry, for example, drilling fluid may become saturated with cuttings, oil, water, and other materials. The saturated drilling fluid is no longer usable and must be discarded. The saturated drilling fluid may include an emulsion that includes the oil constituent of the drilling fluid. Unless the oil constituent of the saturated drilling fluid can be separated from the emulsion, the oil constituent will be discarded with the remainder of the saturated drilling fluid. If the saturated drilling fluid could be demulsified, the oil of the drilling fluid could be recovered and recycled as drilling fluid. Similarly, an emulsion may be present in other forms of used or spent oil. In the case of motor oil, the oil may become soiled with dirt and metal particles during use and an emulsion may be formed of the oil and other constituents of the used oil. Unless the oil constituent of the motor oil can be separated from the spent motor oil, the oil constituent will be discarded with remainder of the spent motor oil.

In order to understand the technology used to separate waste sludges, it is useful to review the theory of emulsion. An emulsion is an intimate mixture of two immiscible liquids, such as oil and water. Two types of oil and water emulsions are commonly encountered, based on the relative amounts of oil and water. The first is an oil dispersed in water (oil in water) emulsion, and the second is a water dispersed in oil (water in oil) emulsion.

A stable oil in water emulsion consists of electrically charged oil droplets dispersed in a polar medium such as water. The violent mixing and shearing of oily wastewater in transfer pumps disperses the minute oil droplets throughout the water, and the friction between the oil and water phases creates static electrical charges at the oil and water interphase and helps to stabilize the emulsion.

This emulsion can be further stabilized by a variety of chemical and physical mechanisms. Surfactants (such as soaps, cresylates, sulfides, and electrolytes) usually carry an electric charge and travel to the oil/water interface (the interfacial film) of the droplets, thus reinforcing the repulsion of the droplets. Fine, solid particles may also stabilize an emulsion if the particles are of the correct size and abundance. The solid particles adsorb at the oil/water interface, reinforce the interfacial film and prevent the droplets from coalescing. Thus, solid particles also reinforce the stability of the dispersion.

The "breaking," or "resolution," of an oil in water emulsion is done by neutralizing the charges at the surface of the droplets. This is performed with a cationic emulsion breaker because the dielectric constants of oil and water cause the oil droplets to carry a negative charge in water. Lowering the pH, with sulfuric acid for example, can also help by converting any carboxyl ions present in the surfactant into carboxylic acid. Once the charges are neutralized, the phases can be gravity separated in an API or CPI separator. This separation can be significantly accelerated by centrifuging the mixture. Treatments to break waste sludges include also floatation, ultrafiltration, activated carbon adsorption, coalescence and solvent extraction.

Water in oil emulsions are viscous, concentrated substances formed when oil comes into contact with water and solids. Where agitation is present, the water becomes dispersed in the oil. Finely divided solids, ranging from colloidal to 100 microns, are particularly effective in stabilizing these emulsions. Other stabilizing agents include soaps, sulfonated oils, asphaltic residue waxes, salt sulfides and mercaptans.

The breaking of a water in oil emulsion can be done with physical methods such as heating and centrifugation. Chemical treatment of water in oil emulsions is directed at destabilizing the dispersed water droplets and solids or at destroying the emulsifying reagents. Usually anionic reagents are employed to destabilize the water droplets because the water droplets tend to be positively charged. Acidification may also be effective if the acid dissolves some of the solids and thus reduces the amount of stabilizing solids. Another method of treatment involves potent demulsifying agents carrying both hydrophilic and lipophilic groups. The demulsifying agent displaces the original emulsifying agent because it has more potent surface active agents. Heating reduces the viscosity of the emulsion and increases the solubility and diffusion of the demulsifying agent in the emulsion. Usually, thorough mixing and heat are both necessary to help disperse the demulsifying agents in the emulsion and to facilitate the separation of the phases once the charges are neutralized. Here again, centrifugation is the key to accelerating the separation.

The emulsions encountered in refinery waste are very diverse because the waste itself is a very heterogeneous material coming from many different processes. Therefore, the separation of refinery waste into its constituents is a very tricky operation, far removed from the cleanliness of the theoretical resolutions described above. The state of the art includes multiple technologies, all attempting to enhance the efficiency of charge neutralization and the settling of the demulsified residual mixture. Myriads of chemical formulations have been created for breaking emulsions, showing by their number and diversity that there is no magic potion that can universally break refinery waste sludges.

Physical methods of resolving refinery waste sludges include sophisticated centrifuges that have been designed to apply high G forces and long residence times (a high $\Sigma$ factor) (see e.g., U.S. Pat. Nos. 4,810,393; 5,443,717). In U.S. Pat. No. 5,443,717 (the '717 patent), for example, a process for producing a quench stream for use in the quench cycle of a delayed coking process is described. A waste stream containing water, organic compounds and solids is treated by centrifugation in a vertical disk centrifuge. After being separated from the oil and water components of the stream, the particulate matter leaves the centrifuge at a very high exit speed and the impact of the solids on the exit shield causes attrition of the particle size. This particle attrition makes the solids produced thereby particularly suitable for use in a coker quench stream.

However, this method requires the use of an expensive centrifuge with a high $\Sigma$ factor and is thus economically disadvantaged, not only because of the high initial outlay for such sophisticated equipment, but also because of its maintenance costs. Further, because the inventors employed particle attrition means only after the separation of the three phases of the waste sludge, they failed to take advantage of shear forces to assist in the resolution of the emulsion. Even if the inventor had been aware of the possibility of resolving emulsions with shear force, the design of the high speed disk centrifuge would not allow the application of shear forces to the emulsion because most of the attrition of the solids due to shear is traced to the projection of solids on a shield as they exit the centrifuge bowl.

U.S. Pat. No. 4,810,393 relates to a process for the resolution of oily sludges that consists of heating the suspension at a temperature exceeding 60° C., and separating the heated suspension in the centrifuge described in the '717 patent into an aqueous phase, an oily phase and into sediments. A flocculent is added to the sediments and, while the temperature is at least 50$20$ C., the water is squeezed out by pressing on a small mesh filter. The sediments are then eliminated either by discharging or by incineration. The heating assists in reducing the viscosity of the oil and increases the solubility and diffusion of the flocculating agent in the emulsion. This process causes particle attrition and therefore the solids can be disposed of in a coker quench stream. The method, however, employs the centrifuge described above, thus contributing to the expense of the method.

Another approach for resolving tight emulsions has been to apply pressure and heat in a pressure cooker. For example, U.S. Pat. No. 4,938,876 describes a process for resolving emulsions by heating the mixture to at least about 115° C., rapidly cooling the mixture to below 100° C., and separating the resulting phases. Preferably, the invention includes the step of adding a flocculent prior to cooling the mixture. The expansion method of achieving rapid cooling apparently serves to break the emulsion by rupturing the microstructure of solids protecting the oil/water interface. Once the solids settle out of the emulsion, they can be separated by centrifugation, settling or filtration. This method is disadvantaged in that applying pressure to bring water to 115° C. and expanding to flash cool necessitates the use of expensive pressure vessels. Further, the efficacy of the process has not been demonstrated on a commercial scale.

Some of these methods work reasonably well to break emulsified material into its constituents and separate them. Usually, however, the solids are not completely de-oiled, making them unsuitable for recycling as a coke quench. Therefore, the solids (if hazardous) must be disposed of either as an alternate fuel for burners or industrial furnaces, or further thermally de-oiled and sent to landfills. Neither solution is as economical as recycling the solids in a coker. Therefore, an economical, efficient means of completely resolving a wide variety of very tight waste emulsions, including refinery waste sludges, is needed.

SUMMARY OF THE INVENTION

Although it is taught that oil, solid and water mixtures can be emulsified by grinding (see e.g., U.S. Pat. No. 5,503,337) or by high shear agitation (see e.g. U.S. Pat. No. 5,125,966), by this invention it has surprisingly been discovered that the application of sufficient shear force can actually serve to break an emulsion, allowing the separation of oil, water and solids. A readily available device, the ball mill, can deliver sufficiently high shear rates to break even the tightly emulsified water in oil emulsions of the petroleum industry. A test with a ball mill was done in a laboratory on two very tight water in oil emulsions and indicated that the ball mill was more effective than traditional demulsifying agents alone in resolving refinery waste sludges. Further, the ball mill resolution was so complete that a mere table top centrifuge provided complete separation of the phases at 500 G. Thus, the technique eliminates the need for expensive centrifuges with high $\Sigma$ factors and G forces of greater than 3,000 or 4,000 or more.

The process for resolving emulsions in waste sludges comprises treating a waste sludge having oil, water and solids in a tight emulsion by applying a shear force to the waste sludge. The shear force should be sufficient to break the tight emulsion and can be determined empirically. Next, the method comprises separating the oil, water and solids to produce three distinct phases. The oil phase can be recycled as commercial grade oil.

In some oily waste sludges, the oil phase contains hydrocarbons that are heavier than water and separate with the solid phase. In one modification of the method, a light oil can be added to the waste sludge to dissolve the heavy hydrocarbons, thus causing them to float, facilitating the complete de-oiling of the solids. In an alternative embodiment, a salt, such as sodium chloride, is dissolved in the emulsion to increase the density of the separated water phase. Most hydrocarbons will float above the brine, which has a density of 1.2 g/l in normal conditions. The brine can be recycled in order to minimize salt consumption.

In an alternate embodiment, the method has a particular application to a process for producing a coker quench stream from waste sludge comprising treating a waste sludge having oil, water and solids in a tight emulsion by shearing the waste sludge to break the tight emulsion; separating the oil, water and solids by gravity or centrifugation; and using the solids slurried in water as coker quench stream. As before, the oil can be recycled and heavy hydrocarbons can be separated with the aid of a light oil or salt.

In yet another embodiment, in an improved process for producing a delayed petroleum coke, wherein a coker quench stream is introduced into a delayed coking vessel during quenching, the improvement consists of treating a waste stream containing an emulsion of water, oil and solids by applying a shear force sufficient to resolve the emulsion. The resolved emulsion is separated into a separate water phase, a separate oil phase containing less than 2% BS&W and a separate solid phase containing less than 8% oil. Then the solid phase is diluted, if necessary, to be a coker quench stream having less than 20% solids and introduced into a coker quench stream during quenching.

The invention relies on the fragility of emulsions to high shear forces and employs a ball mill, roller mill, hammer mill, disk attrition mill, pebble mill, double cage disintegrator, vertical stirring or tower mill, such as those produced by SVEDALA or KUBODA, a vibrator mill, such as those produced by SVEDALA, or similar equipment (see e.g., Perry's Chemical Engineer's Handbook, Chp. 8 (6th ed. 1984)) to break the boundary layer that envelops the water droplets, allowing the droplets to coalesce and thus separate from the oil. Any device capable of applying sufficient shear force to break the emulsion, as determined empirically, will suffice. However, the relatively inexpensive ball mill, such as the SRR (solid rubber rolling) mill, manufactured by SALA, or the vertical stirring mill, also by SALA, are currently preferred. The application of shear force breaks the emulsion and simultaneously reduces the particle size of the solids. Separation of the three phases can then be economically achieved with a Cone Bottom Tank, a Corrugated Plate Interceptor or Inclined Plate Separator, or similar equipment. However, in the event that increased settling speed is desired, centrifugation with the mere Σ factor of a common decanter centrifuge is more than sufficient. If necessary, demulsifying agents and/or a flocculating agent are added to the waste before or after, preferably after, ball milling.

The process described here applies to the resolution of the waste sludges produced by the petroleum and other industries and produces constituents clean enough to be recycled. For example, the method allows the user to treat slop oils, such as tank bottoms, and extract commercial grade oils from the slop oils. It also allows the user to dispose of the solid constituents of a hazardous waste stream in the quench water of a coker in such a manner that the solids are incorporated in the coke without harm to the coking process, as described in U.S. Pat. No. 5,443,717 (incorporated by reference herein). Alternatively, the solids can be used as mixed with oil and used as fuel, per U.S. Pat. No. 5,439,489 (incorporated by reference herein), or dried, thermally desorbed and disposed of in a landfill. The process described herein can also be used to demulsify waste sludges so that the oil constituent of the waste sludge can be treated for use as a liquid fuel.

One example of a waste product that can be demulsified according to the process described herein is oily waste, including used oil. The oil constituent of the oily waste can be separated from the other constituents of the oily waste, thereby permitting the oil constituent to be recycled. Waste sludges from industries other than the hydrocarbon processing industry can be treated in the described manner. For example, oil waste sludges are produced in large quantity by the basic metals industry, the automotive and machining industry, the meat and food processing industry, the textile industry and the like. As an example, in the oil exploration industry, the oil constituent of saturated drilling mud may be separated from an emulsion in the drilling mud so that the oil can be recycled as part of the subsequent production of drilling mud.

Sedimentation separates the constituents based on their apparent density. Therefore, oil constituents that are heavier than water sediment with the solids and contaminate them. In the event that a significant amount of heavy hydrocarbons are entrained with the solid phase, a modification consists of mixing the sludge with enough light oil, such as coker gas oil, to dissolve the heavy hydrocarbons and create a mixture that is lighter than water. This mixture will thereby float and separate from the solids. Alternatively, the density of the water phase can be increased with a salt, thus causing even the heavy hydrocarbons to float above the dense salt water.

Other modifications are possible, depending on the exact waste sludges to be treated. For example, it is sometimes necessary to add reagents, such as emulsion breakers, including but not limited to, polyvalent metal salts, mineral acids, adsorbents, polyamines and polyacrylates and their derivatives, alkyl substituted benzene sulfonic acids, alkyl phenolic resins and their derivatives, substituted polyalcohols, and the like. Likewise, the processes described herein can be combined with other processes and techniques of waste treatment and recycling known in the art. Indeed, because the treatment of tightly emulsified oily waste sludges should be optimized according to the sludge content, each treatment regime will likely comprise a unique combination of the steps described herein and the known prior art steps.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a diagram of the demulsification process of the present invention.

DETAILED DESCRIPTION OF THE INVENTION

As used herein, "oil" comprises any oily or greasy material that is generally immiscible with water. In particular, oil can be the hydrocarbons that constitute the oily part of refinery waste.

As used herein,

As used herein, "solids" are organic or inorganic particulate matter, such as components of the refinery soil, some carbonaceous materials, rust scales, catalyst fines, etc. As used herein, "sludge" is an emulsion of oil, water and solid matter. Sludges are produced in a variety of industries, but are characterized herein as tight emulsions, difficult to break with high G forces or chemical treatments alone. Sludges may be found, for example, at the receiving end of the refinery sewers, the American Petroleum Institute (API) separator as API bottoms or as Dissolved Air Flotation (DAF) float, tank bottoms, heat exchanger bundle cleaning sludge, secondary emulsions, spills, slops, and the like.

The "solids slurry" or "solid phase slurried in water" produced by the present invention may be employed as a "coker quench." To be used as a coker quench, the solids slurry should contain a percentage of solids that does not exceed that above which the slurry's viscosity becomes so high as to make it unpumpable, usually around 5 to 35%, or preferably 25% or 20% by weight when the oil percent is around 6% or less by weight. If necessary, water is added to the solids to ensure pumpability. The maximum level of oil that may remain in a solids slurry to be used as a coker quench is 8% by weight as measured by toluene extraction. Preferably, the oil content will be less than 4% or less than 2%. The solids slurry to be employed as a coker quench must have undergone attrition of the solid particles in such a way that more than 80% of them have a size less than 100 microns, or preferably, less than 50 microns. The size is important to prevent clogging of the coke pores by large particles and thus depends, to some extent, on the size of the open pores of the coke.

As used herein, the separate oil phase produced contains less than 2% BS&W (bottom sediments and water), preferably less than 1% BS&W and most preferably less than 0.5% BS&W, so as to be recycled as oil.

As used herein, the separate solid phase produced contains less than 8% oil, preferably less than 4% and most preferably less than 2%. The combined oil phase and solid phase can be used as a liquid fuel for industrial furnaces, providing thereby a method for disposing of solid waste that is economical and meets with existing environmental regulations. The liquid fuel is obtained by mixing the solid phase, oily phase, and certain chemicals, and by evaporating the residual water phase. A stable suspension is formed of the solids in the separated oil. The stable suspension can be burned as a liquid fuel.

As indicated in the schematic flow diagram, the process of the present invention is described with a particular emphasis on the treatment of waste products generated in the production field or in the refining of petroleum, but it does not have to be so limited. Other wastes generated by industry and municipal facilities that are mixtures of water, oil and solid materials can be treated similarly. The process is particularly adapted, however, to recycling the waste generated in the refining of crude oil to produce purified oil for reuse, purified water for release and de-oiled solid slurries of solids in water for use as coker quench streams.

The equipment that is necessary to achieve the results claimed here is much simpler and cheaper to operate and to maintain than sophisticated three phase disk and nozzle centrifuges and ancillary equipment described in the prior art, resulting in lower capital investment and significantly reduced maintenance costs.

Reference is now made to FIG. 1 for the description of a preferred method for carrying out the process of the present invention.

The refinery waste stream is introduced through line 11 into a cone bottom tank 12 in which it sediments. Free oil and water are decanted out and taken through line 14 to settling tank 21. The concentrated effluent/sludge at the bottom of the cone bottom tank 12 is introduced by line 13 into a ball mill 15. Ball mill 15 has the proper charge of balls both in number and size and grinds the sludge for the proper time to achieve the resolution of the emulsion and achieve simultaneous particle size reduction. Ball mill 15 might optionally be replaced by a less expensive vertical stirring mill or the SRR mill, or similar device.

The resulting sludge is then introduced by line 16 into a separator unit 19, which separates its feed into a liquid phase carried by line 20 into settling tank 21, where it separates into oil that goes back to the refinery by line 22 and water that goes to the refinery Waste Water Treatment Plant (WWTP) by line 24. A small part of that water is carried by line 25 into mixing tank 27 where it is mixed with the effluent of the separator unit 19 entering via line 26 to make the solids pumpable. The resulting aqueous slurry is conveyed by line 28 and pump 29 into the finished slurry tank 30.

In the event the particles take too long to settle under normal gravity, a decanter centrifuge can be used as separator. A demulsifier determined by the lab tests to be the most efficient for that waste stream and/or a flocculent can be added before centrifugation through line 17. An inline mixer 18 insures its proper distribution. In case there is an unacceptable amount of hydrocarbons in mixing tank 27 due to the heavy density of the hydrocarbon (e.g., asphalt), some light oil is introduced by line 17 through the inline mixer 18 into line 16 upstream of the decanter. It dissolves the heavy hydrocarbons and the resulting solution is less dense than a water.

Laboratory tests were performed to demonstrate the efficacy of applying shear force to resolve a tight, refinery waste emulsion. These tests were as follows:

Example 1. Ball Mill Separation of a First Water in Oil Emulsion

A tightly emulsified water in oil emulsion containing dispersed solids was obtained from a refinery tank bottom. It was divided into three one gallon canisters to test the efficacy of the application of high shear force for the resolution of refinery emulsified waste sludges. 50 ml were taken from the first canister, 50 ml of water were added and thoroughly mixed, and the sample was heated to 180° F. and centrifuged at 500 G for 4 minutes without significant separation of its constituents. This confirmed that it was indeed, a tight emulsion.

Sample 1: In initial tests, aliquots of 50 ml of the first canister's contents were mixed with 50 ml of water plus 1000 ppm of several surfactants, thoroughly mixed, heated to 180° F. and centrifuged at 500 G for 4 minutes. Even with the most efficient surfactant, determined to be Callaway 9884, the centrifuge tube presented a residual rag layer floating between oil and water and a layer of fluffy material below the water and above the more compact solids. Thus the demulsification and centrifugation @ 500 G did not ensure total separation.

Sample 2: The contents of the second canister were submitted to ball milling for one hour. Then an aliquot of 50 ml was taken, mixed with 50 ml of water and 1000 ppm of Callaway 9884, heated to 180° F. and centrifuged as indicated above. This time however, the water was clear and the interfaces between phases were surprisingly well defined. Importantly, there was no trace of a rag layer or of fluffy material above the solids. Thus the demulsification and separation were complete.

Sample 3: The contents of the third canister were mixed with 1000 ppm of Callaway 9884 and submitted to ball milling for one hour. An aliquot of 50 ml was mixed with 50 ml of water heated to 180° F. and centrifuged as above. The results were essentially identical to those obtained with the contents of the second canister, indicating that the addition of a surfactant before or during ball milling, did not improve the resolution of the emulsion.

Example 2. Ball Mill Separation of a Second Water in Oil Emulsion

A second water in oil emulsion was tested as above to ensure that the process was applicable to different refinery waste sludges. The second emulsion was also obtained from a refinery tank bottom, but had no inorganic solids. Therefore, road bed dirt and gravel were ball milled to a small particle size, sieved and the fraction between 45 $\mu$m and 1 mm was added to the water in oil emulsion to produce a 20% solids content. The solids were incorporated into the emulsion with a high speed mixer until they were completely dispersed. The emulsion was then divided into samples and treated as above with comparable results.

In conclusion, the high shear forces imparted by ball milling destroy the emulsion with or without the help of the emulsion breaking agents. In contrast, the emulsion was not completely broken with the demulsifier alone. Furthermore, the constituents did not need 500 G to segregate, so while a centrifuge accelerated the sedimentation, it was not essential for the process to work. This is a significant advantage over the prior art, which employ expensive, high speed centrifuges.

The demulsification process described herein also may be used in any industrial application that requires that the oil of an emulsion be released from the emulsion for subsequent use. As an example, in the oil exploration industry, drilling mud is used to lubricate the drill head and bring cuttings to the surface. After a time, the drilling mud becomes saturated with cuttings and other materials. An emulsion may be formed in the saturated drilling mud from a combination of the oil, water, barite, cuttings, and other materials. Using the demulsification process described herein, the oil of the drilling mud may be recovered by demulsifying the saturated drilling mud and physically separating the oil from the other constituents. In this manner, all or a substantial portion of the expensive oil of the drilling mud may be recycled for use as part of a subsequent mixture of drilling mud. This process avoids the problem of having to dispose of the spent drilling mud and allows the recovery of expensive biodegradable materials in the spent drilling mud.

The demulsification process described herein may also be used to recycle other forms of oily waste, including used or spent oil. In the case of used oily waste products that include an emulsion of oil and other contaminants, the demulsification process described herein may be used to separate the oil from the other ingredients of the emulsion. In this manner, the oil constituent of the oily waste can be recycled for a subsequent use. One example is the recycling of used or spent motor oil. After a period of use, metal shavings and dirt contaminate motor oil, forming an emulsion of the base oil, particles, and other liquids. The demulsification process of this invention may be used to separate the oil constituent of the emulsion of the used motor oil from the other constituents of the emulsion so that the oil constituent may be recycled.

Although the present disclosure has been described in detail, it should be understood that various changes, substitutions and alterations can be made hereto without departing from the spirit and the scope of the invention as defined by the appended claims.

What is claimed is:

1. A method for recovering oil in an emulsion in spent drilling mud, comprising the steps of:

applying a shear force to the spent drilling mud, the shear force being sufficient to break the emulsion and being applied by a grinding device; and separating the demulsified oil from the other constituents of the spent drilling mud.

2. The method for recovering oil in an emulsion in spent drilling mud of claim 1, wherein the grinding device is selected from the group consisting of a ball mill, roller mill, hammer mill, disk attrition mill, pebble mill, double cage disintegrator, vertical stirring mill, and vibrator mill.

3. The method for recovering oil in an emulsion in spent drilling mud of claim 1, wherein the grinding device is a ball mill.

4. The method for recovering oil in an emulsion in spent drilling mud of claim 1, wherein the grinding device is a ball mill; and wherein the step of separating the demulsified oil from the other constituents of the spent drilling mud includes the step of using a centrifuge to separate physically the constituents of the spent drilling mud.

5. A method for recovering oil in an emulsion in used oil, comprising the steps of:

applying a shear force to the used oil, the shear force being sufficient to break the emulsion and being applied by a grinding device; and separating the demulsified oil from the other constituents of the used oil.

6. The method for recovering oil in an emulsion in used oil of claim 5, wherein the grinding device is selected from the group consisting of a ball mill, roller mill, hammer mill, disk attrition mill, pebble mill, double cage disintegrator, vertical stirring mill, and vibrator mill.

7. The method for recovering oil in an emulsion in used oil of claim 5, wherein the grinding device is a ball mill.

8. The method for recovering oil in an emulsion in used oil of claim 5, wherein the grinding device is a ball mill; and wherein the step of separating the demulsified oil from the other constituents of the used oil includes the step of using a centrifuge to separate physically the constituents of the used oil.

9. A method for treating a waste stream for the production of a liquid fuel, the waste stream including oil in an emulsion, comprising the steps of:

applying a shear force to the waste stream, the shear force being sufficient to break the emulsion in the waste stream and being applied by a grinding device; and treating the demulsified oil by incorporating solids in a stable suspension to form a liquid fuel.

10. The method for treating a waste stream for the production of a liquid fuel of claim 9, wherein the grinding device is selected from the group consisting of a ball mill, roller mill, hammer mill, disk attrition mill, pebble mill, double cage disintegrator, vertical stirring mill, and vibrator mill.

11. The method for treating a waste stream for the production of a liquid fuel of claim 9, wherein the grinding device is a ball mill.

* * * * *